Nov. 30, 1943.  J. K. WOOD  2,335,834
VARIABLE SUPPORT HANGER
Filed Nov. 26, 1942  2 Sheets-Sheet 1

INVENTOR
JOSEPH KAYE WOOD.
BY
ATTORNEY

Nov. 30, 1943. J. K. WOOD 2,335,834
VARIABLE SUPPORT HANGER
Filed Nov. 26, 1942 2 Sheets-Sheet 2
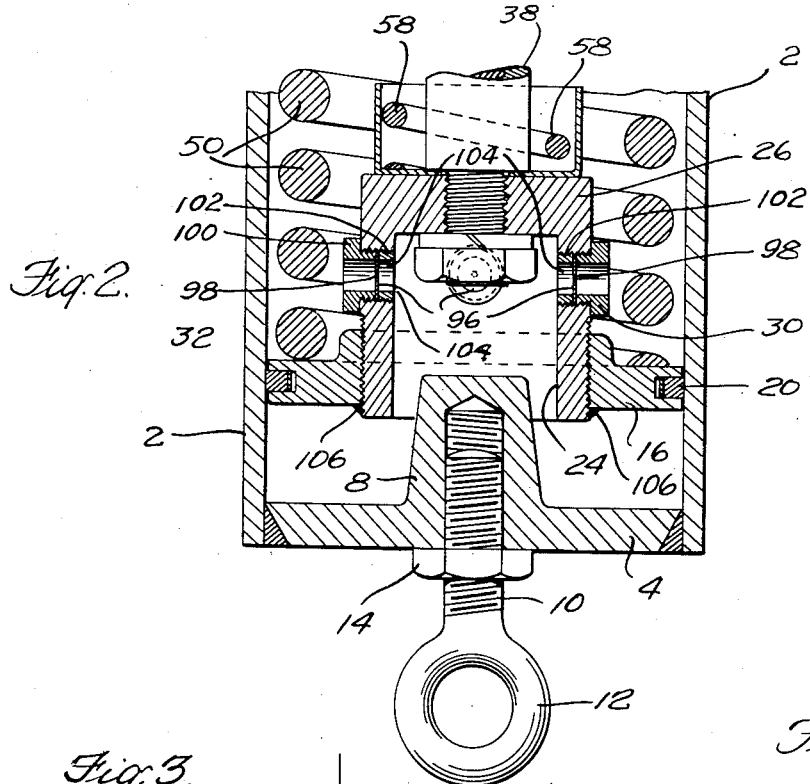
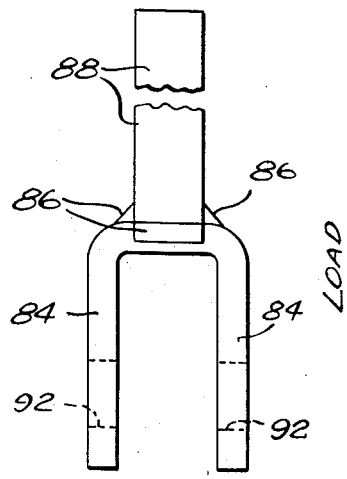
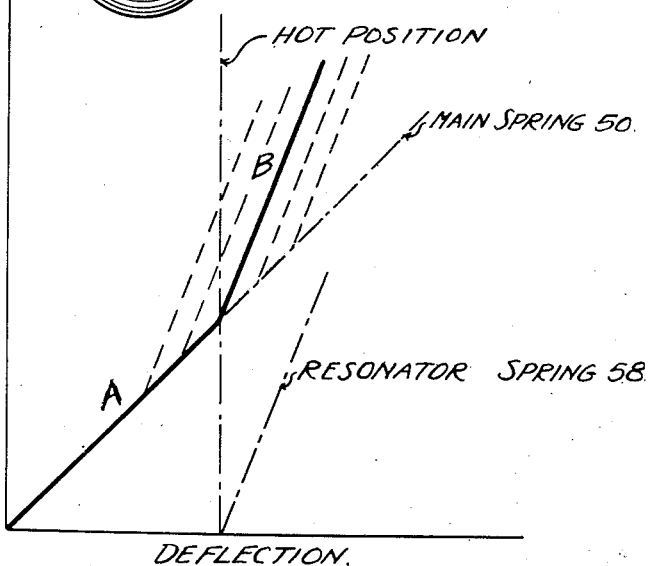
INVENTOR
JOSEPH KAYE WOOD
BY
ATTORNEY Patented Nov. 30, 1943

2,335,834

UNITED STATES PATENT OFFICE 2,335,834

VARIABLE SUPPORT HANGER

Joseph Kaye Wood, New York, N. Y., assignor to General Spring Corporation, New York, N. Y., a corporation of New York Application November 26, 1942, Serial No. 467,034

14 Claims. (Cl. 248—54)

This invention relates to spring hangers for piping and the like, and particularly to spring hangers for steam or other piping which is subjected to variations in temperature and accordingly to expansion and contraction and which is also subjected to considerable vibration. A general object of the invention is to provide a simple and compact hanger for such piping that may be utilized particularly in places where the headroom is low, as, for example, in the boiler and engine rooms of steamships of certain types.

Spring hangers of the constant support type are in general use for piping in which the thermal travel due to high temperatures and vertical rise is considerable. Where, however, the thermal travel is not sufficiently great to warrant the use of constant support hangers, variable support spring hangers or so-called ordinary spring hangers are used.

Constant support spring hangers, which have a substantially horizontal line characteristic, are non-resonant and therefore suitable in pipe lines where there is considerable vibration. However, in variable support spring hangers, in which the characteristic is not horizontal, but has a definite slope, dependent upon the load deflection rate of the spring, there is a natural period of vibration, dependent on this slope. If, in a variable support hanger, therefore, the frequency of an impressed vibration be equal to, or nearly equal to, this natural period, resonance will be established. Because of this characteristic, variable support spring hangers, as they are now used, may, under certain conditions, amplify an impressed vibration, due to resonance, and therefore be unsuitable for a vibrating pipe line.

Since, however, variable support spring hangers will continue to be used where the thermal travel is small and where the cost of constant support spring hangers would be an objection and since such a pipe line may be subject to considerable vibration, it is desirable that provision be made to make such hangers non-resonant to any vibration that may be imposed on the line.

An object of the invention, therefore, is to provide a simple and compact hanger of the variable support type in which provision is made for preventing resonance or harmonic vibration of the load-supporting spring.

Another object of the invention is a simple and compact hanger of the variable support type in which provision for preventing resonance of the main spring is combined with means for damping the ordinary vibrations of the piping which are imparted to the hanger.

Still another object of the invention is the provision of means, in a variable support hanger, for absorbing the energy of the ordinary vibrations of the piping which is so constructed that it will not put undue strain upon the piping when the piping is subjected to more than its usual vibratory movement by an explosion or a collision, as, for example, the explosion of a mine against the hull of a vessel in which hangers of this type are employed to support the piping, or even the shock of an earthquake in stationary power plants.

The invention further aims to provide a variable support hanger which, in addition to having therein the important features hereinabove noted, is so designed that it does not require as much space for its installation as prior variable support hangers. To this end, an important feature of the invention is the arrangement of as many parts as possible of the hanger so that they are either nested in each other or are arranged to telescope in their relative movements whereby the overall length of the structure is greatly reduced.

Other objects and important features of the invention will appear from the following description and claims when considered in connection with the accompanying drawings, in which Figure 1 is a vertical section through a non-resonant variable support hanger embodying the present invention;

Figure 2 shows a modification of the excessive pressure relieving means for retarding the flow of the fluid from one side of the dashpot piston to the other;

Figure 3 shows a clevis-like connection for connecting the upper eye-bolt or support connection of the hanger to the ceiling or other supporting structure of the engine or boiler room or to under side of the deck in ship installations, etc., and Figure 4 is a graph showing the load/deflection characteristics of the springs.

Figure 1:
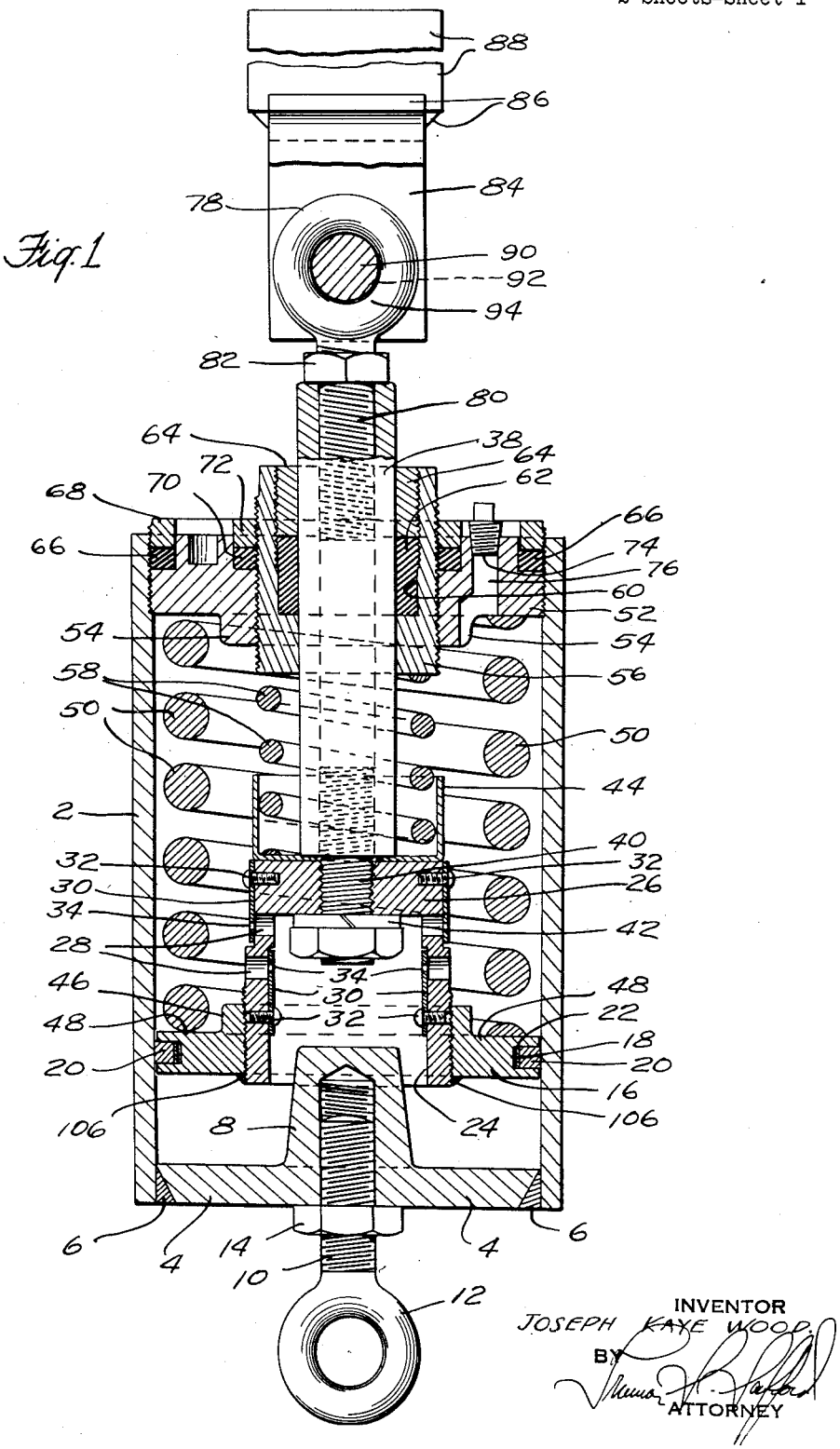

In the illustrative embodiment of a variable support spring hanger having the invention therein, a cylinder 2 is provided with a bottom 4, preferably welded thereto, as shown at 6, to form an integral barrel construction constituting one of the relatively movable members of the hanger. To cut down the overall length of the hanger, the bottom 4 is preferably formed with an inwardly projecting boss 8 which is tapped to receive the threaded shank 10 of an eye-bolt 12 which constitutes the adjustable load connection of the hanger. A lock nut 14 locks the eye-bolt 12 in its different adjusted relations to the cylinder bottom 4, the boss 8 making possible a considerable range of adjustment.

Slidable lengthwise of the axis of the cylinder is a piston 16 having in its peripheral edge a groove 18 to receive a packing ring 20 of the split ring type which may be expanded into engagement with the inner wall of the cylinder 2 in any suitable manner as, for example, by means of a spring expanding member 22. The piston 16 is provided with a recess 24 to receive the boss 8 projecting upwardly from the bottom 4 of the cylinder 2 and, for reasons presently to be set forth more fully, the recess 24 is formed in what was originally a separate member 26 threaded into a central opening in the piston 16.

In order that the piston 16 may serve as part of a dashpot designed to absorb the energy of the ordinary vibrations imparted to the piping and, through the piping, to the hanger, openings 28 through the side walls of the recessed part 26 of the piston are provided so that the fluid contained in the cylinder may flow from one side thereof to the other on the up and down movements of the piston 16. As herein shown, pairs of openings 28 are found in the side wall of the part 26 of the piston, these openings being preferably large enough so that when unobstructed they will provide comparatively free flow of the dashpot fluid, which may be some suitable hydrocarbon oil of not too variable viscosity, between the two sides of the piston. There may be any suitable number of these pairs of openings 28, for example, four pairs 90° apart.

The reason for having pairs of openings is that each spring closure now being described yields in only one direction and it is therefore necessary to have a spring closure for the upstroke and another for the down strike. As shown, each of the openings 28 is covered by a suitably shaped leaf spring 30 which may be held against the side of the opening to be closed by a screw or rivet 32, each of the springs 30 being tensioned so that it will not move away from the opening which it is closing except when a critical pressure is reached. To provide for such passage of the fluid through the openings 28 as is necessary for the ordinary dashpot action of the piston, each of the springs 30 is provided with a small opening 34 therethrough. It will be noted that for each pair of openings 28 there is a spring 30 on one side of one opening to allow for emergency opening on a down stroke of the piston and another spring 30 on the other end of the other opening to allow for emergency opening on the up stroke of the piston.

For convenience in making, assembling and adjusting the parts of the structure, the piston rod 38 is formed of a piece of tubing which is internally threaded at its lower end to receive a machine screw 40 by which the part 26 of the piston 16 is clamped to the lower end of the piston rod 38, a lock washer 42 preventing relative turning of the parts when secured together. There is also preferably clamped between the lower end of the piston rod 38 and the upper face of the part 26 of the piston, a socket 44 which receives and serves as the abutment for the lower end of an auxiliary spring 58 hereinafter to be described.

As shown in the drawings, the main part of the piston 16 is provided with a hub-like central portion 46 into which the part 26 is threaded and the marginal portion of the piston 16 outside the hub 46 serves as a stationary abutment or seat 48 for the main spring 50 of the variable support hanger, the spring 50 being centered on its stationary abutment 48 by the hub 46. The upper movable abutment or seat for this main spring 50 comprises head 52 threaded into the upper end of the cylinder 2 and provided with a similar hub-like portion 54 for centering the spring 50.

Threaded into the central portion of the head 52 is an adjustable abutment 56 for the auxiliary spring 58, this abutment member 56 being of considerable length so as to provide a considerable range of adjustment of the abutment for the auxiliary spring 58 and having within it a recess 60 to receive packing 62. A gland member 64 threaded into the upper end of the recess 60 in the abutment member 56 completes a stuffing box for preventing leakage of fluid about the piston rod 38.

In order to provide a fluid-tight seal for the head 52 packing 66 is compressed against the outer threads in an annular recess or rabbet in the ring 52 by a packing head or gland nut 68 threaded into the upper end of the cylinder 2. Similarly packing 70 is compressed against the inner threads in an inner annular recess or rabbet in the head 52 by means of a packing ring or gland nut 72 threaded upon the outer threads of the abutment member 56. A plug 74 serves to close a filling opening 76 through the head 52 for use in supplying or removing dashpot liquid.

The support connection for the variable support hanger may comprise an eye-bolt 78, the threaded shank 80 of which may be screwed more or less into the upper internally threaded end of the piston rod 38, to effect the required initial adjustment of the hanger, and then be locked in this position by lock nut 82. It will be noted that the eye-bolts 12 and 78 are oppositely threaded so that the assembled hanger may be turned thereon to effect the initial adjustment after the manner of a turnbuckle.

As above stated, the primary means associated with the variable support hanger for connecting it to the fixed support, such as the ceiling or other supporting structure of the engine or boiler room or the under side of the deck in ship installations, is the eye-bolt 78. Any suitable means may be provided for supporting the eye-bolt from the ceiling or other supporting structure or from the under side of the deck such, for example, as the clevis-like member 84, which may be welded, as shown at 86, to any suitable extension bar 88 connected to the under side of the deck or the ceiling or other supporting structure. A pin 90 inserted through the openings 92 in the clevis 84 and through the eye of the eye-bolt 78 may serve to complete the suspension. In order to provide for a more or less universal movement of the suspended hanger, the inner face of the eye of the eye-bolt may be radius-cut as shown at 94.

In Figure 2 is shown a modification of the explosion relief means from that used in the construction shown in Figure 1. Instead of providing springs 30 having openings 34 therethrough for passage of the fluid under ordinary dashpot operation, the springs 30 serving as the closures for the larger openings 28, rupturable perforated diaphragms 96 are provided, these rupturable diaphragms being made of any suitable materials such as thin sheet aluminum and having small openings 98 therethrough to serve the same purpose as the openings 34 in the springs 30. The diaphragms 96 are clamped between threaded plugs 100 and threaded seats 102 through which the large openings 104 are formed. In the modified form of the invention, only a single large opening 104 is required in each position, since the diaphragm 96 may obviously be ruptured equally well either on an upstroke of the piston or a down stroke in the case of emergency, that is, where an excessive pressure is caused by a shock such, for example, as an explosion, a collision or an earthquake.

As above pointed out, the part 26 of the piston 16 which has in it the recess 24 is advantageously made as a separate piece prior to assembling the hanger to facilitate the use of commercial springs in the structure. By making the part 26 as a separate piece threaded into the main part 16 of the piston, preliminary adjustments of the abutment 48 for the spring 50 relative to the abutment 44 for the auxiliary spring 58 can be made, better to suit the structure to the variations in the lengths and load-deflection characteristics of commercial springs than would be possible if the piston were made in one piece. After this adjustment has been made, however, the parts 26 and 16 of the piston are preferably welded together as shown at 106.

In assembling the structure the piston 16 will be in its lowermost position in the barrel part of the hanger, that is, with the lower end of the part 26 of the piston engaging the inner face of the bottom 4 of the fluid chamber, and in this position of the piston, the parts 16 and 26 having been relatively adjusted and welded together as shown, the springs 50 and 58 will be placed upon their respective lower abutments and the ring 52 which provides the upper abutment for the spring 50 will be screwed into the cylinder 2 substantially to the last thread provided for it, thus putting the spring 50 under a predetermined tension.

As hereinabove suggested, one of the important features of the invention is to prevent resonance in the main spring of the hanger when a vibration, having a frequency equal to or nearly equal to the natural period of main spring at the operating temperature, is impressed upon the hanger through its connections to the piping. The normal load-deflection characteristic of a variable support hanger such as herein shown is an inclined substantially straight line. This type of hanger is peculiarly subject to resonance since the supporting force of the spring increases almost directly in proportion to the deflection thereof, either extension or compression, according to the type of spring used. This statement applies, of course, to helical springs, such as here shown, in which the pitch of the coils is substantially uniform.

In prior applications Serial Nos. 390,415 and 433,883, I have shown that by varying the pitch of the coils I can overcome this tendency to resonance. In other words, a variable pitch spring such as shown in my prior application will not have a definite period of vibration at the operating temperature.

To do this, according to the present invention I so adjust the spring 58 with respect to the spring 50 that if a vibratory movement of the supported piping takes place at the operating temperature the supporting force of the spring 58 will be added to that of the spring 50 in one direction of movement of the piping. It will be seen that by so adjusting the spring 58 with respect to the spring 50 a sharp deviation from the inclined straight line characteristic of the hanger will take place and thus there will be no fixed period of vibration at or near the operating temperature and therefore no tendency to resonance.

As shown in Figure 1, the adjustment of the abutment member 56 for the spring 58 is made so that this abutment member 56 just rests upon the spring 58, without putting it under any substantial tension, when the hanger has been adjusted to its operating temperature. When the parts are thus adjusted it will be seen that any vibratory movement of the supported piping, by bringing the spring 58 into operation in the downward part of the vibration, will make a sharp change in the direction of the load deflection curve of the hanger as a whole, the curve turning abruptly upward on the load increase side of this point of change or knee. There are thus two distinct natural periods of vibration in the hanger, one on the reduced load side A of the graph shown in Figure 4, that is, when the force of the spring 50 only is acting on the load, and the other on the steep part B of the graph, that is, when the force of both springs is acting against the pull of the load. The hanger as a whole thus has no single natural period of vibration at the operating temperature and therefore it is impossible to impress upon it from outside any frequency of vibration which will produce harmonic vibrations or resonance therein.

The parts are adjusted so that the spring 58 comes into action at the normal position of rest at the operating temperature so that the amplitude of any impressed vibration straddles the bend or knee in the curve A—B as shown in Figure 4. The broken lines parallel to line B in Figure 4 represent the load deflection characteristics of the hanger beyond the points respectively at which the spring 58 comes into play with various adjustments of the abutment 56 in order to bring the knee or break in the curve at a point corresponding to the position of rest of the load on the hanger at the operating temperature.

As above suggested, this adjustment of the abutment member 56 for the spring 58 may be made by turning it in the ring 52. To effect the adjustment conveniently at the working temperature, when the hanger is assembled the abutment 56 is brought into engagement with the upper end of the spring 58, with the hanger unloaded, and a mark is placed on the piston rod 38 to show this adjustment. It will be obvious that, when the hanger has been put in working position and the piping supported by it has been heated up to working temperature, the position of this mark on the piston rod above the upper end of the abutment 56 will show the amount of compression of the spring 58, and that to bring the abutment 56 into a position in which it is merely in engagement with the upper end of the spring 58, without putting it under compression, it is only necessary to unscrew the abutment 56 until its upper face is again in the same plane as the mark on the piston rod 38.

Although the part 16 of the illustrated hanger has been referred to as a "piston" since in this embodiment of the invention it has a substantially fluid tight fit within the cylinder so that it may act as part of a dashpot where damping means for ordinary vibrations of the supported piping are desirable, it will be understood that in some cases it might serve as a mere plunger to constitute a movable abutment for one end of the spring and to help in guiding the movements of the spring end brought about by the deflection of the spring. The part 16 will therefore be referred to in some of the claims as a "plunger."

From the foregoing description, it will be seen that the present invention provides a simple and inexpensive variable support hanger in which the various essential elements of the hanger are so nested or are so arranged in telescopic relation to each other that the overall length of the hanger is reduced to its substantial minimum. It will further be seen that by a simple expedient, namely, the use of the auxiliary spring 58, the hanger of the present invention is made non-resonant.

By providing a variable support hanger of the simple and compact construction herein shown, in which the energy of the normal vibrations of the supported piping are absorbed in the dash-pot action of the piston 16 in the cylinder 2 and in which those vibrations which might produce harmonic vibrations or resonance in the hanger are prevented from doing so by the use of the auxiliary spring 58, I have provided an inexpensive and compact hanger for which there will be extensive use in situations where the thermal travel is not sufficiently great to warrant the use of constant support hangers or where the vibrations of the pipe line are such that the ordinary resonant variable support hanger would be wholly unsuitable.

What is claimed as new is:

1. A variable support spring hanger for piping or the like comprising a main load-supporting spring, means for connecting one end of said spring to a fixed support, means for connecting the other end of said spring to the piping or other load to be supported, whereby a deflection of said spring substantially proportional to the applied load is produced, an auxiliary spring and means for bringing the force of said auxiliary spring also into supporting relation to the piping or other load, said means being so adjustable in respect to the main spring load connections that the force of said auxiliary spring comes into load-supporting operation only when the supported piping or other load causes an increase in the deflection of the main spring beyond that produced by the normal load pull at the working temperature.

2. A variable support spring hanger according to claim 1 in which one spring end connection comprises a cylinder enclosing both springs and the other spring end connection comprises a rod and a plunger connected thereto and movable within the cylinder, one of said springs being nested within the other.

3. A variable support spring hanger according to claim 1 in which one spring end connection comprises a fluid containing cylinder having closed ends except for a fluid-tight piston rod guide in one end and the other spring end connection comprises a piston rod and a piston slidable in said cylinder and having fluid passages therethrough whereby its constitutes, with said cylinder, a vibration damping dashpot.

4. A variable support spring hanger according to claim 1 in which one spring end connection comprises a fluid-containing cylinder having closed ends except for a piston rod guide in one end and the other spring end connection comprises a piston rod and a piston slidable in said cylinder and having passages therethrough of sufficient capacity for comparatively free fluid flow, said fluid passages having fluid flow restricting means therein relievable under shock created pressure to permit free flow of the fluid through said passages.

5. A variable support spring hanger according to claim 1 in which one main spring end connection comprises a cylinder having closed ends except for a plunger rod guide, in which the other main spring end connection comprises a plunger and a plunger rod, and in which the means for bringing the force of said auxiliary spring into supporting relation to the piping or other load comprises said plunger and an abutment for the other end of said auxiliary spring which is adjustable in the cylinder end into mere engagement with said spring in the load-supporting adjustment of said hanger for the operating temperature of the piping.

6. A hanger according to claim 1 in which the main spring is a compression spring, the connection between the main spring and the load comprises a cylinder closed at its ends except for a plunger rod guide, the connection from the spring to the fixed support comprises a plunger slidable in said cylinder and a plunger rod, and in which an auxiliary spring is nested within said main spring and abuts said plunger at one end, an adjustable abutment being provided for the other end of said auxiliary spring, which is so adjustable in the operative position of said hanger that no substantial part of the normal load is carried by said auxiliary spring.

7. A hanger for piping and the like comprising a main load-supporting compression spring, a spring-enclosing cylinder having closed ends except for a plunger rod guide in one end, a plunger in said cylinder between which and one end of said cylinder said main spring is confined, a rod connected to said plunger and by means of which said hanger may be connected to a support, means at the other end of said cylinder for connecting said hanger to the piping to be supported, an auxiliary spring nested within said main spring and abutting said plunger at one end, and an adjustable abutment for the other end of said auxiliary spring, said last-mentioned abutment being adjustable in respect to the cylinder end abutment for the main spring to a position in which said auxiliary spring is substantially untensioned at the normal operating temperature and position of the piping supported by said hanger.

8. A hanger according to claim 7 in which the end of the cylinder to which the load connection is made has a reentrant boss, an adjustable load connection is threaded into said boss and the plunger is shaped to provide a boss-receiving recess therein.

9. A hanger according to claim 7 in which the ends of the cylinder are fluid tight and the plunger has a piston tight fit in said cylinder and is provided with fluid passages therethrough whereby it serves as a part of damping means for damping the ordinary vibrations of the supported piping.

10. A hanger according to claim 7 in which the end of the cylinder to which the load connection is made has a reentrant boss, the plunger is shaped to provide a boss-receiving recess therein and has a piston tight fit in the cylinder and in which fluid passages through the piston are provided in the side walls of the said recess.

11. A hanger according to claim 7 in which the end of the cylinder to which the load connection is made has a reentrant boss, a load connection is threaded into said boss, the plunger has a reentrant portion to provide a recess for said boss and the auxiliary spring is shorter than the main spring and abuts the outer face of the reentrant portion of said plunger, while the main spring abuts the marginal portion of said plunger.

12. A hanger for piping or the like comprising a fluid-containing cylinder having closed ends except for a piston rod guide in one end, a piston, a piston rod connected to said piston and having a support connection outside said cylinder, a load connection at the other end of said cylinder, a load supporting spring between said piston and the piston rod guide end of said cylinder, said piston having an opening between the two operative faces thereof of sufficient size to permit rapid flow of the fluid from one side thereof to the other, and means in said opening for restricting said flow to an amount sufficient to damp ordinary vibrations of the piping, said means being constructed to yield to an abnormal fluid pressure to relieve excessive stresses in the piping resulting from explosion or other destructive shock.

13. A hanger for piping and the like comprising a fluid-containing cylinder having closed ends except for a piston rod guide in one end, a spring-pressed piston in said cylinder, a piston rod having a support-connection outside said cylinder, a load-connection at the other end of the cylinder, said piston having an opening between its two faces to permit rapid fluid flow between the two sides of said piston, and flow-retarding means in said opening adapted to restrict the flow to a rate suitable for absorbing in the fluid flow the energy of normal oscillations of the supported piping, said flow-retarding means being formed of material rupturable at a predetermined abnormal pressure to relieve excessive stresses in the piping resulting from explosion or other destructive shock.

14. A hanger according to claim 7 in which the cylinder end is provided with a reentrant boss and the plunger is shaped to provide a boss-receiving recess, the recess containing part of said plunger being formed as a separate part threaded into the main part of the plunger to provide an initial relative adjustment of the abutments of the main auxiliary springs to compensate for variations in commercial springs.

JOSEPH KAYE WOOD.